United States Patent [19]
Berthoud

[11] 3,980,458
[45] Sept. 14, 1976

[54] APPARATUS FOR PURIFYING A GASEOUS STREAM

[75] Inventor: André Berthoud, Lancy, Switzerland

[73] Assignee: Technicair S.A., Vernier, Switzerland

[22] Filed: Jan. 2, 1976

[21] Appl. No.: 646,052

[30] Foreign Application Priority Data
Jan. 11, 1975  Switzerland............................ 286/75

[52] U.S. Cl.................................. 55/248; 55/255; 261/119 R
[51] Int. Cl.² ........................................ B01D 47/02
[58] Field of Search...... 55/223, 228, 225, 244–256; 261/119 R, 121 R

[56] References Cited
UNITED STATES PATENTS

| | | | |
|---|---|---|---|
| 1,377,381 | 5/1921 | Worrall................................ | 55/248 |
| 1,792,590 | 2/1931 | Kirk..................................... | 55/225 |
| 2,608,267 | 8/1952 | Ortgies................................ | 55/228 |
| 3,778,979 | 12/1973 | Friedling et al...................... | 55/248 |
| 3,815,332 | 6/1974 | Bobrowsky et al.................. | 55/244 |

*Primary Examiner*—Bernard Nozick
*Attorney, Agent, or Firm*—Kurt Kelman

[57] ABSTRACT

A gaseous stream is passed from an upstream channel through a bubbling washing liquid into a downstream channel whence it passes through a horizontal channel and the purified gas is sucked out by a fan. A partition wall extending below the normal level of a washing liquid in a sump separates the upstream from the downstream channel and the horizontal channel is defined between two walls an upper one of which has an upstream end connected to the upper end of the partition wall while the lower wall is shorter and has an upstream end spaced from the partition wall. A vertical wall has an upstream end connected to the downstream end of the upper horizontal wall and is spaced from the downstream end of the lower horizontal wall, and an inclined bottom wall connects the downstream end of the vertical wall to the sump for returning collected washing liquid carried by the gaseous stream to the sump. The fan circulates the gaseous stream through the channels while bubbling it through the liquid in the sump.

10 Claims, 4 Drawing Figures

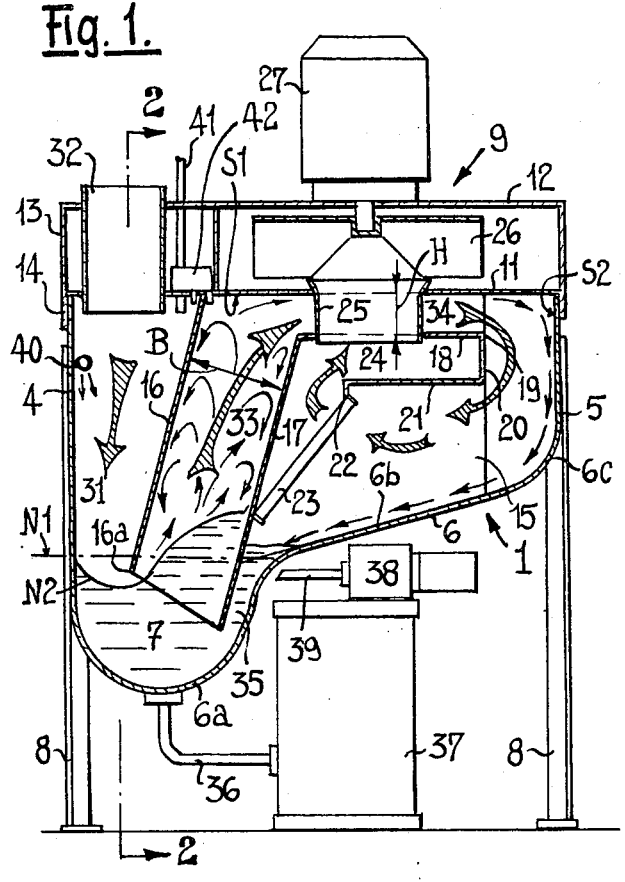
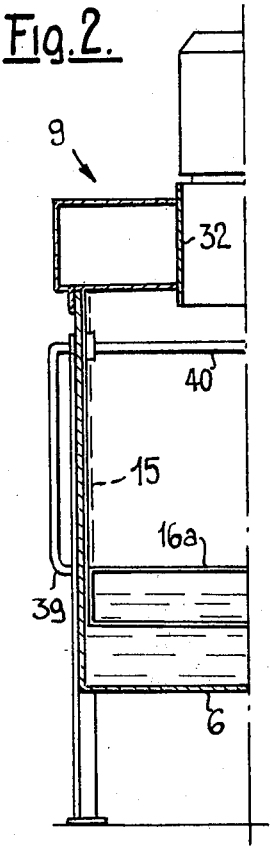
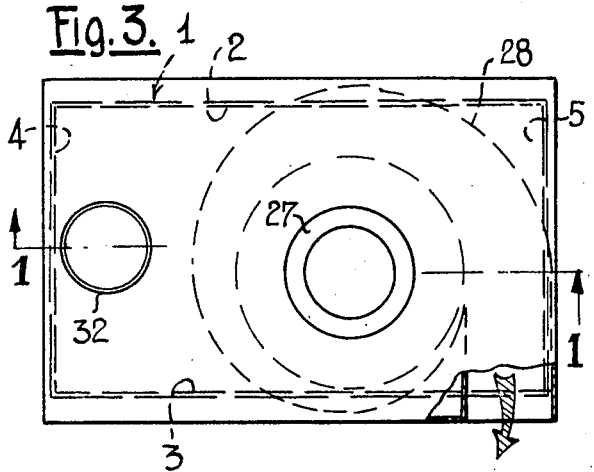
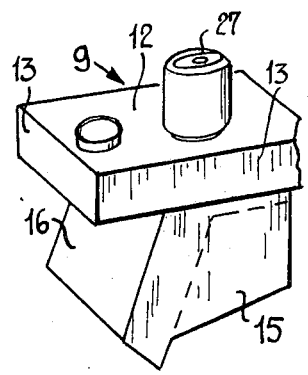

APPARATUS FOR PURIFYING A GASEOUS STREAM

The present invention relates to improvements in apparatus for purifying a gaseous stream charged with particles, which comprises a bubbling device in which the gaseous stream is bubbled through a washing liquid.

In such apparatus, the gaseous stream, after having been bubbled through the liquid, is passed through chambers and along baffles to wet the particles in the gaseous stream thoroughly, thus assuring the retention of the wetted particles by gravity or centrifugal separation. Difficulties have been encountered with the baffle arrangements in known apparatus of this type.

It is the primary object of this invention to provide a bubbling device for an apparatus for purifying a gaseous stream charged with particles, which has a minimum of baffles and whose baffles are so arranged as to avoid or at least reduce the formation of curtains of liquid drops in the path of the gaseous flow.

The above and other objects are accomplished in accordance with the invention with a bubbling device including a sump containing a washing liquid assuming a normal level when the liquid is at rest in the sump, an inlet for the gaseous stream substantially vertically above the sump, and a channel system through which the gaseous stream is sucked. This channel system comprises a substantially vertical partition wall having a lower end extending below the normal level of the liquid in the sump, the partition wall separating a substantially vertical upstream channel between the inlet and the sump from a substantially vertical downstream channel arising from the sump whereby a gaseous stream passes downwardly through the upstream channel into the liquid in the sump and upwardly from the liquid in the sump through the downstream channel, two substantially horizontal walls defining therebetween a horizontal channel in communication with the downstream channel, the upper horizontal wall having an upstream end connected to the upper end of the partition wall and constituting an abutment surface substantially perpendicular to the downstream channel, the upwardly passing gaseous stream moving against the abutment surface, and the lower horizontal wall being shorter than the upper wall and having an upstream end spaced from the partition wall, and a substantially vertical wall having an upstream end connected to the downstream end of the upper horizontal wall and constituting an abutment surface substantially perpendicular to the horizontal channel, the gaseous stream moving through the horizontal channel against the abutment surface, and the vertical wall being spaced from the downstream end of the lower horizontal wall. An inclined bottom wall connects the downstream end of the vertical wall to the sump for returning collected washing liquid carried by the gaseous stream to the sump. A suction chamber is arranged below the horizontal channel and is in communication therewith, and suction means has an input in communication with the suction chamber whereby suction applied to the chamber circulates the gaseous stream from the inlet and through the channels while bubbling it through the liquid in the sump.

The above and other objects, advantages and features of the present invention will become more apparent from the following detailed description of a now preferred embodiment thereof, taken in conjunction with the accompanying drawing wherein FIG. 1 is a side elevational view in section along line 1—1 of FIG. 3;

FIG. 2 is a partial view of the apparatus in section along line 2—2 of FIG. 1;

FIG. 3 is a top plan view of the apparatus; and

FIG. 4 is a partial perspective view of the cover.

Referring now to the drawing, there is shown generally rectangular casing 1 having two generally parallel side walls 2, 3 and two generally parallel transverse side walls 4, 5 perpendicular to walls 2, 3. Bottom 6 extends between transverse side walls 4, 5 and has a first part 6a defining sump 7 and a second part 6b constituting an inclined bottom wall connecting the downstream end of vertical side wall 5 with sump 7. Wall 5 and bottom part 6b are interconnected by an arcuate wall portion 6c and vertical side wall 4 is similarly connected to the sump. The illustrated sump is of semi-cylindrical configuration.

Casing 1 is supported at its four corners by legs 8 and its open top may be closed by removable cover 9 which has a flange 14 to fit the cover over the top of the casing. The cover is a hollow housing defining an interior chamber between horizontal upper wall 12 and lower wall 11 interconnected by side walls 13.

As shown in FIGS. 2 and 4, two cheek plates 15 project downwardly from lower cover wall 11 and these cheek walls are positioned immediately adjacent casing walls 2, 3 when the cover is fitted on the open top of the casing. Substantially vertical partition wall 16 and interior wall 17 extend between the cheek plates, wall 16 being affixed to lower cover wall 11 and interior wall 17 being substantially parallel to the partition wall. The upper end of interior wall 17 is spaced from lower cover wall 11 and is connected to lower horizontal wall 18 which is parallel to upper horizontal wall 11, the lower wall 18 also extending between the cheek plates. Thus, walls 16, 17 and 18, and cheek plates 15 form an integral, removable unit.

Downstream end 19 of lower horizontal wall 18 is spaced from vertical wall 5 of casing 1 and is connected to a downwardly extending short wall 20 to which, in turn, is connected horizontal baffle wall 21 extending in the direction of interior wall 17 and having a downstream end 22 spaced from this wall. Walls 20 and 21 also extend between the cheek plates and form part of the integral, removable cover unit. A separator of liquid drops 23 is mounted obliquely between downstream end 22 of baffle wall 21 and interior wall 17, a support for the separator extending from wall 17 to hold the separator in position.

The space between horizontal walls 18 and 21 defines suction chamber 25 into which opens tubular suction conduit 25 passing through horizontal channel 34 and constituting the input of centrifugal ventilator or fan 26 turning about a vertical axis and entrained by electric motor 27 mounted on the cover. Wall 21 forms a baffle extending over the major portion of the mouth of suction tube 25. Fan 26 sucks purified gas into suction chamber 24 and delivers it from its output into spiral chamber 28 in the hollow cover whence the purified gas stream leaves the apparatus, as shown in FIG. 3.

In operation, sump 7 is filled with water or any other suitable purging liquid until it has reached normal level N1 which, at rest, is above lower end 16a of partition wall 16. The cover unit is now placed on top of casing 1, as shown in FIG. 1, and a gaseous stream charged with particles is sucked through inlet conduit 32 in the cover by operation of fan 26. The suction applied by the fan causes the gaseous stream to flow down from inlet 32 through upstream channel 31, violently hit the water in sump 7, depressing it to sinuous level N2, bubbling through the water, ascend through downstream channel 33, pass through horizontal channel 34 and into suction chamber 24 whence the fan removes the gaseous stream through suction tube 25 and discharges it into the cover chamber 28 to leave this chamber in purified form.

As the rapidly moving gaseous stream leaves sump 7, it entrains numerous drops of water. This stream moves upwards through channel 33 against abutment surface S1 constituted by cover wall 11 and extending substantially perpendicularly to the direction of flow of the gaseous stream. The resultant strong eddies at the top of channel 33 tend to brake the flow of the gaseous stream and permit the heavier drops of water containing wetted particles contained in the gaseous stream to fall back into the sump while, at the same time, washing the walls of the channel. As the purged gaseous stream moves horizontally along channel 34, it hits abutment surface S2 constituted by vertical wall 5 extending substantially perpendicularly to the direction of flow of the gaseous stream.

In the preferred illustrated embodiment, horizontal channel 34 has a height H smaller than width B of downstream channel 33 so that the flow velocity of the gaseous stream increases in the horizontal channel. In this manner, the largest part of the water entrained by the gaseous stream through the horizontal channel is projected forcefully against surface S2 where it accumulates and descends in the form of a water curtain along wall 5 and inclined bottom wall 6 back into sump 7, passing through relatively narrow gap 35 between the wall of sump 7 and vertical wall 17 which descends into the sump more deeply than vertical wall 16. Remaining drops of water are caught in separator 23 and thence returned into the sump, permitting the purified gaseous stream, free of water drops, to enter suction chamber 24 and to be removed through suction tube 25. The passage of the gaseous stream, for instance air, is shown in FIG. 1 by hatched arrows while the principal trajectories of water drops and curtains are shown by small arrows in full lines.

Due to the vertical disposition of downstream channel 33 and abutment surface S2 perpendicular thereto, the largest part of the water entrained by the gaseous stream from the water bath in sump 7 is returned thereto by gravity through this channel, washing the ascending gas and thoroughly wetting the particles therein so that these heavy particles may fall into the sump. Then, due to the increased velocity on horizontal channel 34, any remaining drops of water in the gaseous stream are hurled against vertical wall 5 where they accumulate and run down the wall back into the sump. In view of the fact that only small amounts of water are left in horizontal channel 34, no curtain of water drops is formed at the downstream end of lower horizontal wall 18 so that the gaseous stream is not rehumidified before it reaches separator 23 which, accordingly, may be of relatively small dimension. The washing of the walls of the channels through which the gaseous stream flows, particularly inclined bottom wall 6, assures the return of retained impurities into the bottom part of the liquid bath in sump 7, which remains calm, only the top portion of the bath being agitated by the gaseous stream flowing therethrough. The polluted water is removed from the bottom of the sump by discharge pipe 36 leading to filter 37 whence it is received by pump 38 and delivered into pipe 39 leading to sprinkling pipe 40 disposed in the upper part of upstream channel 31. The gaseous stream entering through inlet 32 is thus sprinkled with clean water. Additional water is fed into the bubbling device through water feed pipe 41 mounted in the cover and including valve 42 which is automatically controlled by a differential pressure gage which establishes the difference in pressures between upstream channel 31 and downstream channel 33. This pressure differential thus controls the supply of additional water through pipe 41.

As will be understood from the above description of the structure and operation of the bubbling device, all impurities retained in the device are returned to sump 7 while the walls of the device remain clean due to the continuous washing thereof produced by abutment surfaces S1 and S2 which are arranged perpendicularly to the direction of flow of the gaseous stream.

Removal of the integral cover unit from casing 1 gives ready access to all the interior wall surfaces of the casing, these surfaces being smooth and without any crevices which would permit or encourage encrustations. The maintenance of the entire apparatus is accordingly very simple. The smooth and rounded corners connecting the bottom of the casing to its transverse side walls assure the return of all residual impurities into the sump whence they are removed through pipe 36.

If desired, suction tube 25 could be disposed laterally of an opening in a lateral wall of the casing.

I claim:

1. An apparatus for purifying a gaseous stream charged with particles, which comprises a bubbling device including
   1. a sump containing a washing liquid assuming a normal level when the liquid is at rest in the sump,
   2. an inlet for the gaseous stream substantially vertically above the sump,
   3. a substantially vertical partition wall having an upper end and a lower end extending below the normal level of the liquid in the sump, the partition wall separating
      a. a substantially vertical upstream channel between the inlet and the sump from
      b. a substantially vertical downstream channel arising from the sump to an upper end whereby a gaseous stream passes downwardly through the upstream channel into the liquid in the sump and upwardly from the liquid in the sump through the downstream channel,
   4. two substantially horizontal walls defining therebetween a horizontal channel in communication with the downstream channel,
      a. an upper one of the horizontal walls having a downstream end and an upstream end connected to the upper end of the partition wall and constituting an abutment surface substantially perpendicular to the downstream channel, the upwardly passing gaseous stream moving against the abutment surface, and
      b. a lower one of the horizontal walls being shorter than the upper horizontal wall and having an upstream end spaced from the partition wall and a downstream end,
   5. a substantially vertical wall having an upstream end connected to the downstream end of the upper horizontal wall and a downstream end, the vertical wall constituting an abutment surface substantially perpendicular to the horizontal channel, the gaseous stream moving through the horizontal channel against the abutment surface, and the vertical wall being spaced from the downstream end of the lower horizontal wall,
6. an inclined bottom wall connecting the downstream end of the vertical wall to the sump for returning collected washing liquid carried by the gaseous stream to the sump,
7. a suction chamber below the horizontal channel and in communication therewith, and
8. suction means having an input in communication with the suction chamber whereby suction applied to the chamber circulates the gaseous stream from the inlet and through the channels while bubbling it through the liquid in the sump.

2. The apparatus of claim 1, further comprising a generally rectangular casing having two transverse side walls generally parallel to each other, one of the transverse side walls and the partition wall defining the upstream channel therebetween, the other side wall constituting the substantially vertical wall, and a bottom extending between the two side walls, the bottom having a first part defining the sump and a second part constituting the inclined bottom wall.

3. The apparatus of claim 1, wherein the cross section of the horizontal channel perpendicular to the gaseous stream flow is smaller than that of the downstream channel.

4. The apparatus of claim 1, wherein the suction means comprises a centrifugal fan arranged above the horizontal channel and a vertical suction conduit passing through the horizontal channel, the conduit connecting the suction chamber and input of the fan.

5. The apparatus of claim 4, further comprising a baffle wall having a downstream end and an upstream end connected to the downstream end of the lower horizontal wall and extending towards the downstream channel over a major portion of an inlet end of the conduit to define the suction chamber between the lower horizontal wall and the baffle wall.

6. The apparatus of claim 5, further comprising a substantially vertical interior wall defining the downstream channel with the partition wall, an upper end of the interior wall being connected to the upstream end of the lower horizontal wall and the interior wall being spaced from the downstream end of the baffle wall, and a separator of drops of the liquid mounted obliquely between the downstream end of the baffle wall and the interior wall for return of liquid drops into the sump.

7. The apparatus of claim 1, further comprising a removable cover for the bubbling device, the cover including two downwardly projecting cheek plates, two substantially vertical walls extending between the cheek plates, one of the vertical walls constituting the partition wall and the other vertical wall defining the downstream channel with the one vertical wall, and the lower horizontal wall extending between the cheek plates.

8. The apparatus of claim 7, wherein the cover is a hollow housing, the suction means comprising a centrifugal fan having an input and an output, the fan being mounted in the housing, a vertical suction conduit passing through the horizontal channel into the hollow housing, the conduit connecting the suction chamber and the input of the fan, and the output of the fan opening into the hollow housing which constitutes a receiving chamber for the purified gaseous stream, the fan being rotatable about a vertical axis.

9. The apparatus of claim 1, further comprising a substantially vertical interior wall defining the downstream channel with the partition wall and extending below the normal level of the liquid in the sump, the interior wall and the sump defining a gap therebetween.

10. The apparatus of claim 9, wherein the interior wall descends into the liquid lower than the partition wall.

* * * * *